United States Patent [19]
Diggs

[11] 3,993,041
[45] Nov. 23, 1976

[54] SOLAR ENERGIZED STEAM GENERATOR SYSTEM

[76] Inventor: William F. Diggs, 3302 Clifton Ave., Baltimore, Md. 21216

[22] Filed: Oct. 23, 1975

[21] Appl. No.: 625,092

[52] U.S. Cl. .............................. 126/271; 237/1 A; 126/400
[51] Int. Cl.² ................................................ F24J 3/02
[58] Field of Search .................. 126/270, 271, 400; 237/1 A

[56] References Cited
UNITED STATES PATENTS

| | | | |
|---|---|---|---|
| 3,250,269 | 5/1966 | Sherock | 126/271 |
| 3,919,998 | 11/1975 | Parker | 126/271 |
| 3,946,721 | 3/1976 | Keyes et al. | 126/400 |

*Primary Examiner*—Kenneth W. Sprague
*Attorney, Agent, or Firm*—Oblon, Fisher, Spivak, McClelland & Maier

[57] ABSTRACT

A solar energized steam generator includes a flux collector or projection lens for collecting and concentrating solar energy, and a reflector funnel for enhancing and concentrating the solar energy still further. The lower end of the funnel is connected by means of a conduit to an insulated vault, made of, for example, rock, gravel, stone, sand, or the like, whereby the heated air is conducted directly to the vault so as to heat the same to extremely high temperatures. An air duct, operatively connected to the vault, is disposed in heat exchange relationship with a steam generator and is also fluidically connected to the reflector funnel through a fluid duct or conduit, a fan or blower being disposed within the duct or conduit for recirculating the air throughout the system. The blower may be a two-speed blower so as to operate at high speed during time periods wherein solar energy is being received by the lens and funnel amplifier, and at low speed during those time periods when such energy is not being received, and in order to maximize the interception and collection of the radiated solar energy, the lens is mounted upon an altazimuth system which continuously varies the disposition of the lens relative to the sun in order to continuously properly align the lens therewith throughout the solar day, as well as adjusts the position of the lens so as to compensate for the alteration of the relative disposition between the sun and earth throughout the solar year.

14 Claims, 3 Drawing Figures

U.S. Patent
Nov. 23, 1976
3,993,041
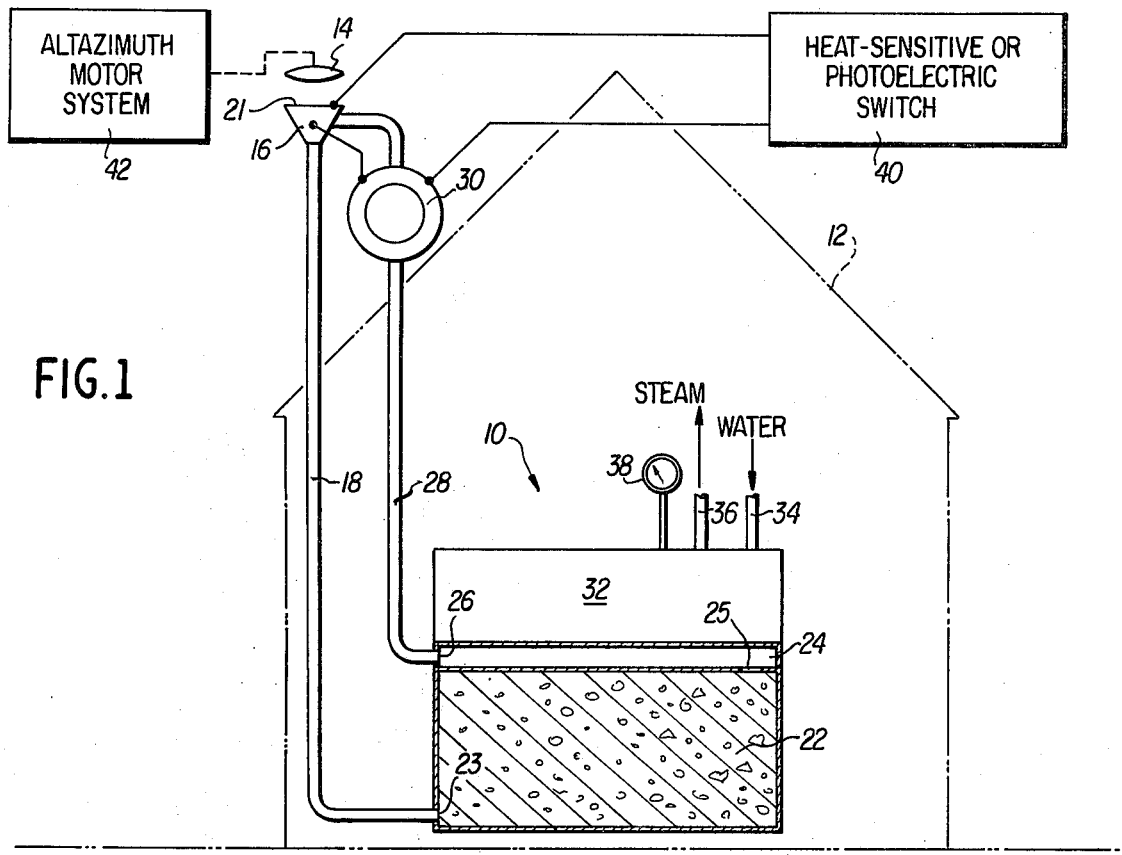
FIG.1
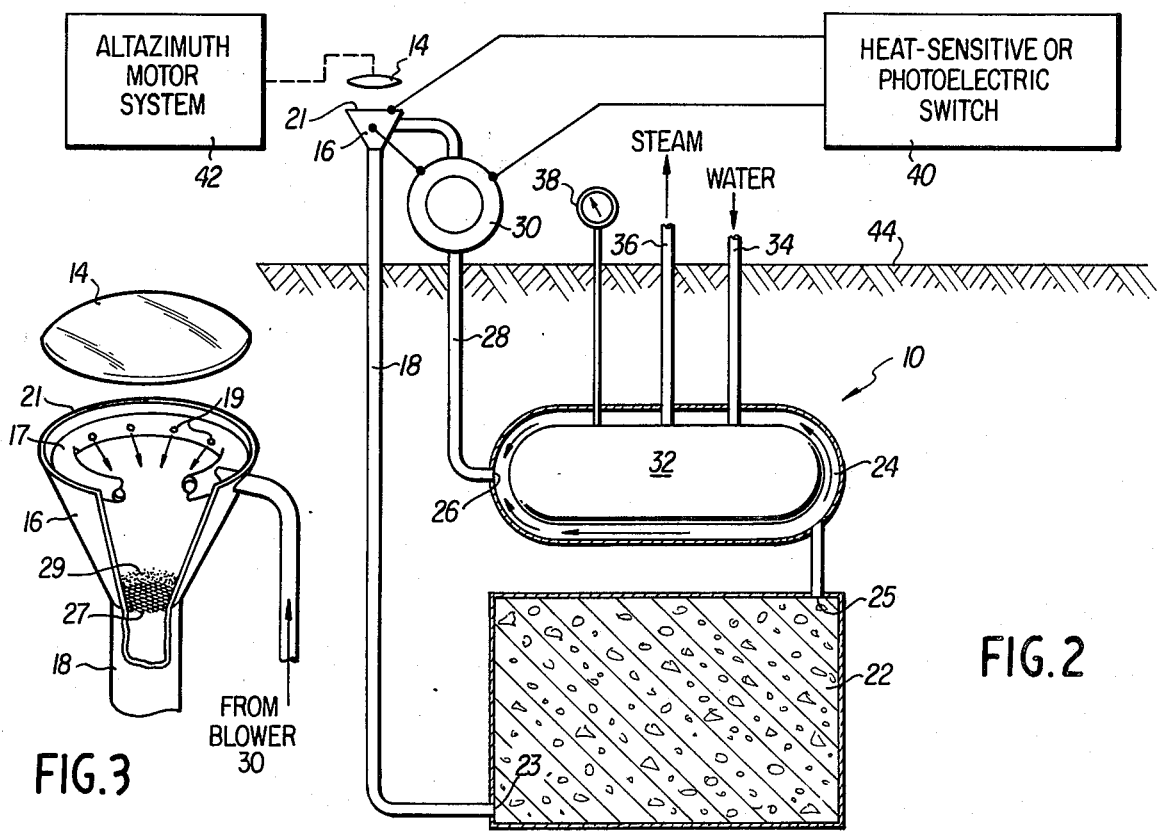
FIG.2
FIG.3

SOLAR ENERGIZED STEAM GENERATOR SYSTEM

BACKGROUND OF THE INVENTION

1. Field of the Invention

The present invention relates to steam generators, and more particularly to a stream generator which is powered or energized by means of solar energy or radiation.

2. Description of the Prior Art

The utilization of solar energy for domestic and industrial applications has heretofore been proffered, by interested scientists and engineers, as a practicable solution to current energy problems, and with ever-increasing demands being placed upon the conventional, non-replaceable fossil fuels, such as for example, coal, natural and synthetic gases, petroleum products, and the like, and in light of the realistically predicted and potential shortages thereof, the importance and necessity of practical apparatus, capable of effectively utilizing solar energy, the supply of which is virtually inexhaustible, takes on new dimensions.

The utilization of solar energy, however, presents problems which are especially peculiar, as a result of the intermittent, unreliable, and variable nature of the solar cycle, and consequently, solar energized or powered systems must effectively accommodate, and compensate for, such eccentricities. In addition, in order to render such solar energized systems publicly acceptable whereby such systems will in fact be widely employed as an effective means of reducing the demand and use of conventional fuels and sources of power, it is necessary that such systems be simple, efficient, inexpensive to construct, maintain, and operate, and exhibit long service lives.

SUMMARY OF THE INVENTION

Accordingly, it is an object of the present invention to provide a new and improved solar energized power system.

Another object of the present invention is to provide a new and improved steam generator system.

Still another object of the present invention is to provide a new and improved solar energized steam generator system which is extremely simple and inexpensive to construct, maintain, and operate.

Yet another object of the present invention is to provide a new and improved solar energized steam generator system, which, due to its simple construction, exhibits a long and reliable service life.

Still yet another object of the present invention is to provide a new and improved solar energized steam generator system which can readily compensate for the intermittent, unreliable, and variable nature of the solar cycle.

A further object of the present invention is to provide a new and improved solar energized steam generator system which, as a result of means embodied within the system for readily compensating for the intermittent, unreliable, and variable nature of the solar cycle, exhibits a high degree of efficiency.

The foregoing and other objectives are achieved in accordance with the present invention through the provision of a solar energized steam generator system which includes a flux collector or projection lens for collecting and concentrating the solar energy, and a reflector funnel for enhancing and concentrating the solar energy still further. The lower end of the funnel is connected by means of a conduit to an insulated vault, which may be made of, for example, rock, gravel, sand, stone, or the like, whereby the heated air is conducted directly to the vault so as to heat the same to extremely high temperatures. An air duct, operatively connected to the vault, is disposed in heat exchange relationship with a steam generator and is also fluidically connected to the reflector funnel through means of another fluid duct or conduit, a fan or blower being disposed within such duct or conduit for recirculating the air throughout the system. The blower may be a two-speed blower so as to operate at high speed during the time periods solar energy is being received by the lens and funnel amplifier, and at low speed during those time periods when such energy is not being received, and in order to maximize the interception and collection of the radiated solar energy, the lens is mounted upon an altazimuth system which continuously varies the disposition of the lens relative to the sun in order to continuously properly align the lens therewith, as well as adjusts the position of the lens so as to compensate for the alteration of the relative disposition between the sun and earth throughout the solar year.

BRIEF DESCRIPTION OF THE DRAWINGS

Varies other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a schematic view of a solar energized steam generator system constructed in accordance with the present invention and showing its cooperative parts;

FIG. 2 is a view similar to that of FIG. 1, showing however another embodiment of a solar energized steam generator system; and FIG. 3 is a partial perspective view, partly broken away, of the funnel portion of the apparatus showing its detailed construction.

DETAILED DESCRIPTION OF THE ILLUSTRATED EMBODIMENTS

Referring now to the drawings, and more particularly in FIG. 1 thereof, a first embodiment of a solar energized steam generator system, constructed in accordance with the present invention and generally indicated by the reference character 10, is adapted to be disposed within a domestic residence or other edifice 12 and is seen to include a flux collector or projection lens 14 disposed above a funnel-shaped upper portion 16 of a vertically oriented, tubular conduit 18, the top of funnel portion 16 being closed by means of a glass dome 21, which may be made, for example, of Pyrex. The lower end of the tubular conduit 18 is fluidically connected interiorly of the lower portion of a vault 22, through means of a port or opening 23, which is disposed within a lower portion of the edifice 12, lens 14 and the upper portion of conduit 18 being of course disposed exteriorly of edifice 12 so as to in fact be subjected to the solar radiation.

The vault 22 is disposed within suitable insulation, not shown, whereby the vault material, which may be, for example, suitable rock, gravel, sand, stone, firebrick, or the like, will serve to increase and retain the heat capacity of the vault. The lens 14 is of course provided for concentrating the rays of the sun into funnel 16, and as will be explained hereinafter in greater detail, the rays, further concentrated by funnel 16, cause the air within the system to be heated to high temperatures whereupon the same being conducted to the vault 22, the vault material will in turn be heated to extremely high temperatures, the vault material, of the type noted heretofore, being particularly heat absorptive and durable.

An air duct or conduit 24, having a port or opening 25 at one end thereof for fluidically connecting the duct 24 with the interior portion of vault 22 in a manner similar to the connection between amplifier portion 18 and vault 22, is disposed about vault 22 and is further provided with another port or opening 26, at the other end thereof, which has operatively associated therewith one end of another substantially vertically oriented fluid conduit 28, the other end of conduit 28 being integrally joined, in an air-tight manner, to funnel portion 16 of the conduit 18.

An enclosed fan or blower 30 is disposed within conduit 28 at a position adjacent funnel portion 16 and in this manner, air is continuously circulated within the closed system comprising conduit 18, vault 22, air duct 24, and conduit 28.

As noted more particularly within FIG. 3, the upper portion of conduit 28 is directly connected to an annular ring or tube 17 integrally formed within the upper portion of funnel 16 and the ring or tube 17 is in turn provided with a plurality of downwardly directed air jets 19 disposed equidistantly around the circumference thereof. In addition, a screen 27 is secured within the bottom of funnel 16 and suitable porous material 29, such as, for example, sand, gravel, coarse asbestos fibers, or the like, is supported upon the screen so as to reflect the solar beams, the screen also being made of high heat-resistant material. In this manner, the downwardly directed jets of air are directed upon the screen 27 and reflective material 29 and are immediately effectively pre-heated thereby, the air still being able to enter conduit 18 as the screen 27 and its supported material 29 is of course porous.

Disposed above air duct 24, and in heat exchange relation therewith, is a steam boiler or generator 32 which is of course provided with a water infeed or supply conduit 34 and a steam exhaust conduit 36, a pressure gauge 38 also being operatively associated with generator 32, and it is noted that the length of generator 32 substantially corresponds to that of duct 24 in order to maximize the heat exchange time period.

In operation, air is continuously circulated within the closed system by means of fan or blower 30, and as the air enters funnel portion 16 and tubular conduit 18 the air exits from the jets 19 and is heated to extremely high temperature as a result of the interaction with screen 27 and material 29 as well as the concentration of solar energy by means of lens 14. As a result of such heating of the air, and the conveyance of such heated air to the vault material, the temperature of the vault is raised to extremely high levels.

As the air passes through the vault 22, its temperature is increased still further, as a result of the continuous heating of the vault material directly by means of the heated air from conduit 18, as well as by the heat accumulated and stored within vault 22 as determined by the heat capacity thereof which is dependent upon the type of material employed with the vault as well as the construction of the same, and as such air is conducted through air duct 24, the same experiences a heat exchange process with steam generator 32 whereby the water, entering generator 32 through means of the conduit 34 and circulating therethrough, is converted to steam which is exhausted through conduit 36. The air entering conduit 28 from duct 24, through means of port 26, having been cooled somewhat as a result of the aforenoted heat exchange process having occured within generator 32, is recirculated, by means of fan 30, so as to again enter funnel portion 16 and tubular conduit 18 whereby reheating of the air is performed by means of the lens 14 and reflector funnel 16.

It is to be noted that as the port 23, fluidically interconnecting the tubular conduit 18 with the interior portion of vault 22, is provided within the lower portion of vault 22, at one end thereof, while port 25, fluidically interconnecting the air duct 24 with the interior portion of vault 22, is provided within the upper portion of vault 22 at the opposite end thereof relative to the end within which the port 23 is provided, substantially the entire volume of the vault 22 is effectively uniformly heated by means of the heated air flow induced therethrough by means of fan or blower 30 as well as by the natural tendency of the heated air to rise within the vault 22 after its entry thereinto through means of the port 23.

In addition, the flow path and consequent heating of the heated air through vault 22 is maximized as a result of the dispositions of ports 23 and 25 therewithin, and in like manner, the relative disposition of ports 25 and 26 within air duct 24 serves to similarly maximize and uniformize the heat exhange process between duct 24 and steam generator 32, such structure of course serving to maximize the efficiency of the system. It is also to be noted that while only one lens and reflector unit has been disclosed in connection with the vault 22, it is apparent that a plurality of such units may be appropriately connected to a single vault in order to saturate the vault with sufficient heat as determined by its heat capacity.

In order to increase the efficiency of the system still further, the fan or blower 30 should be a variable speed blower, such as for example, a two-speed blower, and the same is disposed within an electrical circuit, along with the funnel portion 16, within which a heat sensitive or light-sensitive photoelectric switch 40, operatively connected to or mounted upon funnel portion 16, is also disposed. In this manner, switch 40 is able to detect those operative periods when a predetermined amount of solar radiation energy is in fact fully and directly impinging upon reflector 16 whereby the switch will actuate fan or blower 30 so as to operate the same at high speed and thereby maximize the steam generator output of the system, while if the switch 40 does not detect such a predetermined amount of intense solar radiation, such as for example, during cloudy or overcast weather conditions, or during nighttime hours, the switch will in turn actuate fan or blower 30 so as to operate at low speed whereby only a minimum amount of heat, supplied from vault 22 will be recirculated throughout the system, such quantity of heat nevertheless being sufficient to maintain boiling of the water within steam generator 32 and thereby obtain a minimum quantity of steam generated therefrom.

Still yet further, in order to compensate for the variable relative movement between the sun and the earth throughout the solar day, as well as the altered relative when a predetermined amount of solar energy is detected as impinging upon said reflector means and for actuating said blower means to operate at a low rate of speed when less than said predetermined amount of solar energy is detected.

11. A solar energized steam generator system as set forth in claim 1, wherein:
said vault and said steam generator means are disposed underground.

12. A solar energized steam generator system, as set forth in claim 1, wherein:
said vault and said generator means are disposed within an edifice.

13. A solar energized steam generator system, as set forth in claim 1, wherein said reflector means comprises:
a funnel;
a screen disposed within the bottom of said funnel and supporting solar ray reflective material; and
air jet means for directing air, being recirculated by said blower means, onto said screen and reflective material.

14. A solar energized steam generator system as set forth in claim 13, wherein said air jet means comprises:
a tubular ring integrally formed within the upper portion of said funnel; and
a plurality of air jet openings disposed equidistantly about the circumference of said ring.

* * * * * position between the sun and the earth throughout the solar year, the projection lens 14 is mounted upon or within an altazimuth motor system 42 which continuously rotates the lens 14 throughout the day in order to properly align the same with the sun and thereby maximize the solar energy intercepted and collected by means of the lens 14. In addition, the motor system 42 is further selectively adjustable so as to compensate for the change in the relative azimuth between the sun and earth as a result of the passage of time throughout the solar year.

Referring now to FIG. 2, a second embodiment of the present invention is disclosed wherein, in lieu of the generator system being disposed within an orifice 12, the entire system, except of course for lens 14, reflector 16, and the upper portion of conduit 18, is disposed underground, the depth of which vault 22 is deposited within the earth and beneath the earth's surface 44 being variably selected to be within the range of 8–50 feet. It will also be noted that air duct 24 completely encases the steam boiler or generator 32 and that the duct 24 and generator 32 are physically disposed and spaced above vault 22.

Thus, it may be seen that the present invention has important advantages over the known prior are solar systems in that the solar energy is collected and concentrated and heated air is conducted directly to the insulated vault so as to thereby heat the same to extremely high temperatures, the air being conducted through the reflector and tubular conduit by means of the blower or fan. In addition, the same heated air is conducted through the vault in such a manner as to uniformly heat the same as well as be heated still further thereby, and such air is then utilized to heat water within a steam generator, the air subsequently being recirculated back to the optical reflector so as to be preliminarily reheated thereby. In this manner, a single fluid is utilized within the system for providing heat to the vault material as well as for heating the water within the steam generator.

Obviously, many modifications and variations of the present invention are possible in light of the above teachings. It is to be understood therefore that within the scope of the appended claims, the invention may be practiced otherwise than as specifically described herein.

What is claimed as new and desired to be secured by Letters Patent of the United States is:

1. A solar energized steam generator system, comprising:
    solar energy collecting and concentrating means for collecting and concentrating solar energy;
    optical reflector means operatively connected to said collecting and concentrating means for receiving said collected and concentrated solar energy and for concentrating said solar energy still further.
    insulated vault means operatively connected to said reflector means for directly receiving heated air from said reflector means so as to be directly heated thereby;
    air conduit means interposed between said vault and said reflector means for conducting air from said vault back to said reflector means;
    blower means disposed within said air conduit means for recirculating said air through said reflector, said vault, and said air conduit means, said air being heated within said reflector means and said vault; and
    steam generator means operatively connected to said air conduit means in a heat exchange relationship for receiving said heat from said heated air in order to generate steam from water supplied to said steam generator means through water infeed means.

2. A solar energized steam generator system as set forth in claim 1, wherein:
    said solar energy collecting and concentrating means is a projection lens.

3. A solar energized steam generator system as set forth in claim 2, further comprising:
    altazimuth motor means for selectively adjusting and continuously varying the disposition of said projection lens with respect to the sun as the position of the sun, relative to the earth, is varied throughout the solar day and solar year.

4. A solar energized steam generator system as set forth in claim 1, wherein:
    said reflector means is connected to the lower portion of said vault means and within one end thereof so as to permit said heat to rise within said vault and thereby distribute said heat throughout said vault.

5. A solar energized steam generator system as set forth in claim 4, wherein:
    said air conduit means is connected to the upper portion of said vault means and at the end thereof opposite said one end of said vault means within which said reflector means is connected,
    whereby the flow path of said heated air through said vault is maximized so as to uniformly distribute said heat within said vault and to maximize the heat imparted to said heated air as the same traverses said vault flow path.

6. A solar energized steam generator system as set forth in claim 1, wherein:
    said air conduit means comprises an air duct fluidically connected to said vault and an air conduit fluidically connected to said air duct at one end thereof and to said reflector means at the other end thereof;
    the length of said air duct substantially corresponding to that of said steam generator; and
    the fluidic connections of said air duct between said vault and said air conduit being disposed within opposite ends of said air duct,
    whereby the heat exchange process between said air duct and said steam generator is maximized and uniformed.

7. A solar energized steam generator system, as set forth in claim 6, wherein:
    said air duct completely encases said steam generator means.

8. A solar energized steam generator as set forth in claim 1, wherein:
    said vault is made of rock, stone, sand, gravel, firebrick, or the like.

9. A solar energized steam generator system, as set forth in claim 1, wherein:
    said blower means is a variable speed blower.

10. A solar energized steam generator system as set forth in claim 9, further comprising:
    a heat or light sensitive switch means operatively connected to said reflector means and said blower means for detecting the heat or light impinging upon said reflector means and for actuating said blower means to operate at a high rate of speed